United States Patent [19]

Müller et al.

[11] Patent Number: 4,979,875
[45] Date of Patent: Dec. 25, 1990

[54] CENTRIFUGAL PUMP FOR THE DELIVERY OF HOT LIQUIDS

[75] Inventors: Hermann Müller, Oldendorf; Wilfried Lehmann, Heiligenstedten; Ralf Mann, Huje, all of Fed. Rep. of Germany

[73] Assignee: Sihi GmbH & Co. KG, Itzehoe, Fed. Rep. of Germany

[21] Appl. No.: 350,628

[22] PCT Filed: Oct. 16, 1987

[86] PCT No.: PCT/EP87/00609
§ 371 Date: Apr. 14, 1989
§ 102(e) Date: Apr. 14, 1989

[87] PCT Pub. No.: WO88/02821
PCT Pub. Date: Apr. 21, 1988

[30] Foreign Application Priority Data

Oct. 17, 1986 [DE] Fed. Rep. of Germany ... 8627766[U]

[51] Int. Cl.[5] .............................................. F04D 29/12
[52] U.S. Cl. ................................. 415/168.1; 415/227; 277/67
[58] Field of Search ............... 415/170.1, 171.1, 173.3, 415/174.2, 110, 111, 229, 230, 231, 168.1, 168.2, 168.3, 169.1, 169.2; 277/67, 68, 22, 81 R, 93 R, 93 S D

[56] References Cited

U.S. PATENT DOCUMENTS

| 1,990,519 | 2/1935 | Bigelow et al., | 277/68 |
|---|---|---|---|
| 2,203,525 | 6/1940 | Dupree, Sr. | 415/111 |
| 3,111,904 | 11/1963 | Burns | 415/174.2 |
| 3,589,738 | 6/1971 | Tracy | 277/93 R |
| 3,600,101 | 8/1971 | Oglesby | 415/230 |
| 4,621,975 | 11/1986 | Larson | 415/110 |
| 4,695,223 | 9/1987 | Caspar et al. | 415/111 |

*Primary Examiner*—Robert E. Garrett
*Assistant Examiner*—Hoang Nguyen
*Attorney, Agent, or Firm*—Chilton, Alix & Van Kirk

[57] ABSTRACT

Centrifugal pump for the delivery of hot media, in particular of hot water with at least one shaft passage through the pump housing (1,2) to the outside, which passage is provided with a mechanical seal (5). The sealing space is separated from the pump housing by a spacer zone (8) with close shaft play. For the avoidance of sealing disturbances by accumulated gas, the sealing space contains first means (12, 20, 21) for the generation of a liquid circulation in the sealing space with intensive impingement of the sliding surface area of the mechanical seal, second means (12, 18, 21) for the stabilization of the liquid circulation away from the mechanical seal and thirdly a large-volume, flow-stabilized, ventable receiving space for separated gas. The gas fractions are thereby reliably isolated from the mechanical seal, separated from the liquid circulation and accumulate in the upper region of the sealing space, so that they are extracted from the liquid circulation and can be drawn off.

34 Claims, 4 Drawing Sheets

CENTRIFUGAL PUMP FOR THE DELIVERY OF HOT LIQUIDS

The invention relates to a centrifugal pump for the delivery of hot liquids with at least one shaft passage through the pump housing to the outside, which passage is provided with a mechanical seal, which is arranged inside a sealing space which contains the delivered liquid, is separated from the pump housing by a spacing zone with close shaft play and comprises means for the generation of a liquid circulation within the sealing space for the flushing of the sliding surface area of the mechanical seal.

Highly stressed mechanical seals are rinsed in order to carry away the heat occurring in the sliding surface area. In the case of the known pump mentioned at the beginning (DE-A-No. 21 40 959), the flushing is effected by liquid circulation within the sealing space. For this, there is provided on a rotating part of the mechanical seal a delivery thread, which interacts with the close sealing housing and generates an axial flow in the sealing space, which is returned through a channel connecting the ends of the sealing space such that it hits the sliding surface area of the mechanical seal. The heat taken up by the flushing stream is given off by the ambient air in the region of the return channel. Heat input by liquid exchange with the delivery stream of the pump is virtually ruled out by the fact that the sealing space is in connection with the pump only via a narrow shaft gap.

This arrangement is suitable for liquids such as thermal oil. In the case of use for hot water, however, difficulties have arisen at the mechanical seal. The invention comprises the realization of the decisive reasons for this. Even if the sealing space is completely filled with hot water at the beginning of operation, gas can gradually separate out from it and accumulate in the sealing space. This process does not end when the quantity of liquid in the sealing space has given off its gas content, because a very slight liquid exchange with the pump takes place all the time and therefore small amounts of gas are also separated out all the time and cannot be flushed out of the sealing space due to the design. On account of the centrifugal effect of the liquid rotating in the sealing space with the mechanical seal, the separated gas tends to accumulate on the mechanical seal and to disturb the flushing effect necessary there. Cooling and lubrication of the sliding surface area is thereby put at risk.

This problem occurs not only in the case of pumps other than of the generic type in which the sealing space is in flushing connection with the delivery stream, because then any separations are carried away out of the sealing space, as are solid foreign particles. For instance, a pump is known (DE-A-34 38 662), in which the sealing space is in connection by a first channel with a region of high pressure and by a second channel with a region of low pressure of the pump. In the case of another known pump (DE-A-31 37 692), a circulation path which serves for the flushing away of foreign substances, such as sand, from the mechanical seal, is formed by constructing a tubular wall within the sealing space. It remains open here in which way the sealing space is connected to the pump space. However, since it is not to be assumed that the seal flushing stream may enrich the foreign substances and return to the mechanical seal, there must be a flushing connection with the pump space.

Finally, it is known (FR-A-2 288 241), to provide the sealing space, separated from the pump space by a narrow shaft gap, with a flushing and cleaning opening arranged at the top, which would be suitable for the removing of gas accumulations when the pump is at a standstill; but there is no corresponding indication as to use.

The invention is therefore based on the object, on the basis of the realization explained above, of making a centrifugal pump of the type mentioned above suitable for the use of gas-containing liquids.

The solution according to the invention consists in the combination of features that include
- means for the stabilization of the liquid circulation away from the mechanical seal,
- a large-volume, flow-stabilized, ventable receiving space for separated gas and
- devices for the removing of accumulated gas.

The first functional element of the invention consists in the intensive flow impingement of at least the sliding surface area of the mechanical seal in order to remove from there gas bubbles which lodge on the mechanical seal or accumulate in its region. For this, recourse is made to the known flushing devices.

A second functional element of the invention consists in the stabilization of the liquid circulation away from the mechanical seal for the purpose of making possible the separation of the gas bubbles carried away from the mechanical seal.

It can be realized in a way known to a person skilled in the art, in particular by the provision of large flow cross-sections away from the mechanical seal.

Finally, a functional element of the invention consists in that a sufficiently large-volume receiving space for separated gas is provided, which preferably lies in the upper region of the sealing space. It must be flow-stabilized such that the gas located there is not entrained back into the circulation. It must, furthermore, be ventable, in order that the gas can be carried away at least periodically. It should be noted that there must be a connection between the parts of the circulation path in which the gas separation takes place and the gas receiving space, in order that the gas can pass out of the flow circulation into the receiving space.

In the case of a pump not of the generic type (GB-A-1 174 767), the sealing space of which is arranged vertically above the pump space, it is known for preservation of the self-priming ability of the pump to connect the central impeller region by large bores to the sealing space, in order that gas bubbles accumulating in the impeller can be carried away into the sealing space and from there through a venting line, which is possibly connected to a vacuum pump. In order that the gas can be carried away from the sealing space, the latter contains ribs which protrude radially, outside to inside towards the seal and prevents the liquid contained in the sealing space from rotation, so that the gas can separate from the liquid and accumulate in the upper part of the sealing space, where the venting line is connected. The sliding surface area of the seal is likewise located in this upper part of the sealing space at the same height as the connection of the venting line. In solving the problem underlying the invention, of avoiding operating difficulties of the pump of the generic type when in use for certain liquids, the known arrangement could not be a model because it is not of the generic type and there was no cause to look for ideas arising from known devices for preserving the self-priming ability of pumps. The known arrangement is also misleading to the extent that it leads to the accumulation of gas in the sliding surface area of the seal and thus invites the very difficulties which are to be avoided by the invention.

The sealing housing is preferably subdivided into an inner region and an outer region, which together form the circulation path and which have at least one connection close to the sliding surface of the mechanical seal and a connection axially remote therefrom. The subdivision may take place by means of a wall, which is essentially tubular.

The intensive flow impingement of the mechanical seal can, according to the invention, be improved by their being provided at least one rib, which is taken up to the mechanical seal periphery all but for a small distance (for example 1 to 2 mm) and the inner edge of which effects a violent turbulence at the seal periphery, which tears free the gas bubbles located there, so that they can be removed with the liquid circulation. For this it has also proved advantageous if the rib is arranged below the height of the shaft, that is in the geodetically lower region of the sealing space, and/or runs obliquely to the axial direction.

It may suffice if only one such rib is provided, in particular if the inner region and the outer region of the sealing space are separated from each other by a tubular wall. There may also be a plurality of these extending, without special separation, between the two regions from the sealing space wall to the mechanical seal, as a result of which there are formed between the individual ribs and the sealing space limitation chambers which form an inner, narrow region close to the mechanical seal and a wide region on the outside, so that the circulation flow runs rapidly and turbulently on the inside at the periphery of the mechanical seal, and in particular at the ribs, and runs calmly on the outside.

The ribs may contain break-throughs, in order that the gas extracted from them can rise to the gas receiving space.

If the inner region and the outer region of the sealing space are separated by an essentially tubular wall, there may—as known per se—be provided for intensification of the circulation a delivery thread, which acts between the wall and a part rotating with the mechanical seal. As a result, an intensive through-flow is achieved, in particular during the initial phase of the pump, which ensures a complete and rapid degassing.

The gas receiving space, and the flow stabilization therein, may be formed by at least one rib which is disposed in the outer region of the sealing space, preferably in its upper region, runs transversely to the circumferential direction and expediently lies ahead of the upper apex, seen in direction of rotation of the pump, for example at about 45°. The gas can collect in the stabilized space after the rib. The rib should leave a small passage cross-section free, which makes possible the passage of the gas to the receiving space, without impairing the flow stabilization. This small passage cross-section is advantageously formed by a gap between the rib and the outer limitation of the part-region containing the rib.

According to a further feature of the invention, the sealing space is connected to a region of high pressure in the pressure region of the pump. If the sealing space is also connected to a region of lower pressure of the pump, there is expediently provided in this latter connection a restrictor, which may be formed for example by a sliding bearing which lies between the pump and the spacer zone. The connection to the region of high pressure of the pump may be established by a special bypass line. This arrangement has the effect that a pressure which corresponds approximately to the high pressure in the pump is achieved in the mechanical sealing space. A precondition for this is that the restricting effect of the bypass line is distinctly less than the restricting effect of the sliding bearing or of the restricting zone. This achieves the effect that the medium in the mechanical sealing space is given a greater margin from the boiling state and therefore a more reliable operation of the mechanical seal is possible.

It is not necessary for the entire gas receiving volume to be within the sealing space. Rather, according to the invention, at the sealing space there may be arranged a venting pot, which makes additional receiving volume available and is provided with venting devices. In this case also, however, in agreement with the above remarks, there must be within this sealing space an outer, flow-stabilized receiving space for separated gas, from which the gas can pass into the venting pot.

The venting devices may be automatically or manually operable. The venting should, of course, take place where the gas collects, generally at the geodetically highest point. Furthermore, a sensor (or more than one sensor) may be contained in the sealing space or venting pot for the monitoring of operating conditions. As a result, for example the necessary venting of the sealing space can be controlled or the pump unit disconnected if the mechanical seal is at risk.

The invention is described below with reference to the exemplary embodiments represented in the drawing, in which.

In the case of a pump not of the generic type (GB-A-1 174 767), the sealing space of which is arranged vertically above the pump space, it is known for preservation of the self-priming ability of the pump to connect the central impeller region by large bores to the sealing space, in order that gas bubbles accumulating in the impeller can be carried away into the sealing space and from there through a venting line, which is possibly connected to a vacuum pump. In order that the gas can be carried away from the sealing space, the latter contains ribs which protrude radially, outside to inside towards the seal and prevents the liquid contained in the sealing space from rotation, so that the gas can separate from the liquid and accumulate in the upper part of the sealing space, where the venting line is connected. The sliding surface area of the seal is likewise located in this upper part of the sealing space at the same height as the connection of the venting line. In solving the problem underlying the invention, of avoiding operating difficulties of the pump of the generic type when in use for certain liquids, the known arrangement could not be a model because it is not of the generic type and there was no cause to look for ideas arising from known devices for preserving the self-priming ability of pumps. The known arrangement is also misleading to the extent that it leads to the accumulation of gas in the sliding surface area of the seal and thus invites the very difficulties which are to be avoided by the invention.

The sealing housing is preferably subdivided into an inner region and an outer region, which together form the circulation path and which have at least one connection close to the sliding surface of the mechanical seal and a connection axially remote therefrom. The subdivision may take place by means of a wall, which is essentially tubular.

Figure 1:
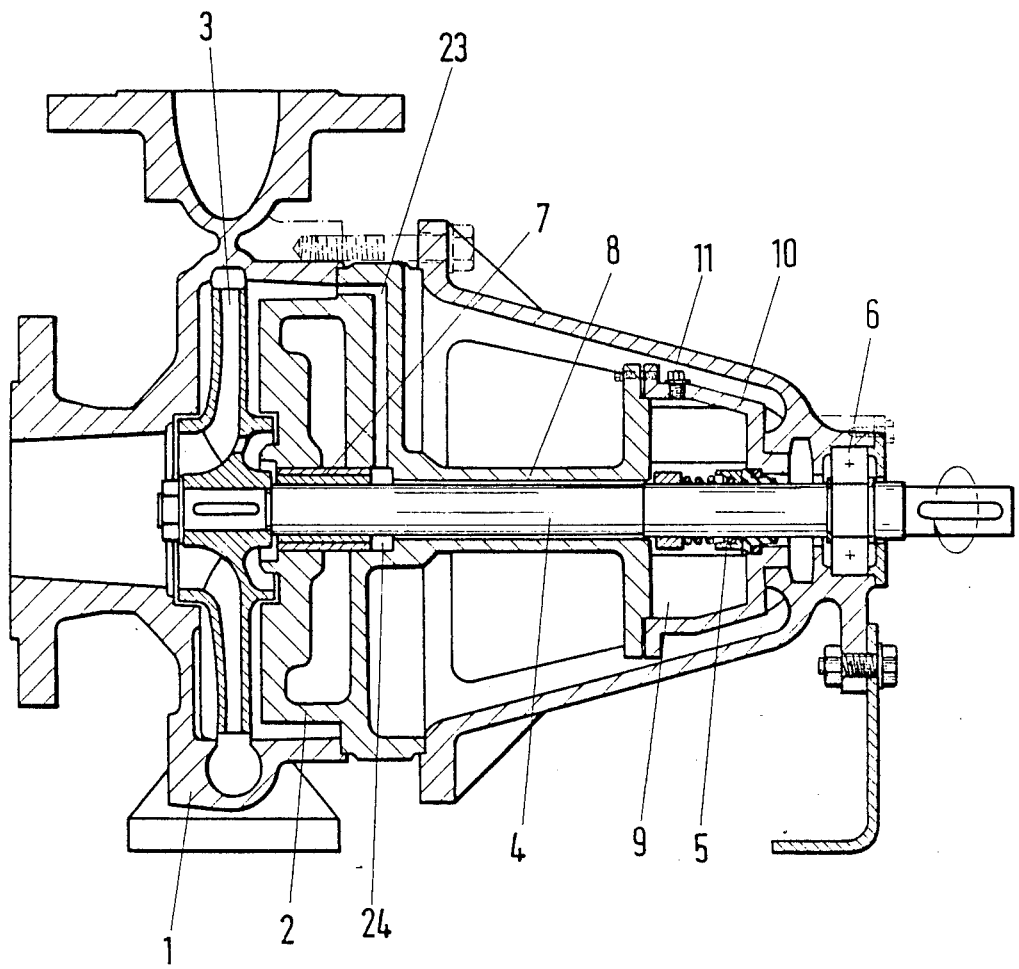
FIG. 1 shows a longitudinal section through the pump

FIG. 1 shows a centrifugal pump with a pump housing, consisting inter alia of a spiral housing 1 and a housing cover 2 as well as the associated impeller 3 on a shaft 4, the outlet of which from the housing is sealed off by a mechanical face seal 5. The shaft 4 is mounted on the one hand in the rolling bearing 6 arranged outside the pump housing and on the other hand inside the pump housing in a slide bearing 7. Between this bearing and in the mechanical seal 5 there lies a tubular part of the housing cover 2, which is designed as spacer zone 8 and surrounds the pump shaft 4 with a narrow gap. The mechanical seal 5 is located in a sealing space 9 within a seal housing 10, which has a venting device 11 in the geodetically highest region. The sealing space is voluminously widened. As a result, the quantity of liquid contained therein is increased and the supply to the mechanical seal improved and the gas receiving capability increased as a result. An intensified heat dissipation is also achieved by the increased housing surface.

The housing cover 2 is of multi-walled design, for the purpose of increasing the temperature gradient. It forms two connections of the sealing space to the delivery path of the pump, namely firstly by the restrictingly acting slide bearing 7 to a region of low pressure and secondly by a special channel 23 to a region of high pressure. This channel is connected to the space 24 on the seal side of the slide bearing 7. Due to the restricting effect of the slide bearing 7, which could also be achieved by a special restrictor if a slide bearing is dispensed with at this point, the space 24, and consequently the sealing space 9, is under high pressure. This achieves the effect that the pressure difference from atmospheric pressure is increased and therefore any evaporation of the medium does not take place in the sealing gap, or at most on the extreme outside, and the probability of disturbance is reduced as a result. Furthermore, due to the connection of the channel 23 to the space 24 on the pump side of the spacer zone 8, it is achieved that the stream of fresh, gas-containing medium through the channel 23 does not reach the sealing space 9 and thus no additional gas separation takes place there.

Figure 3:
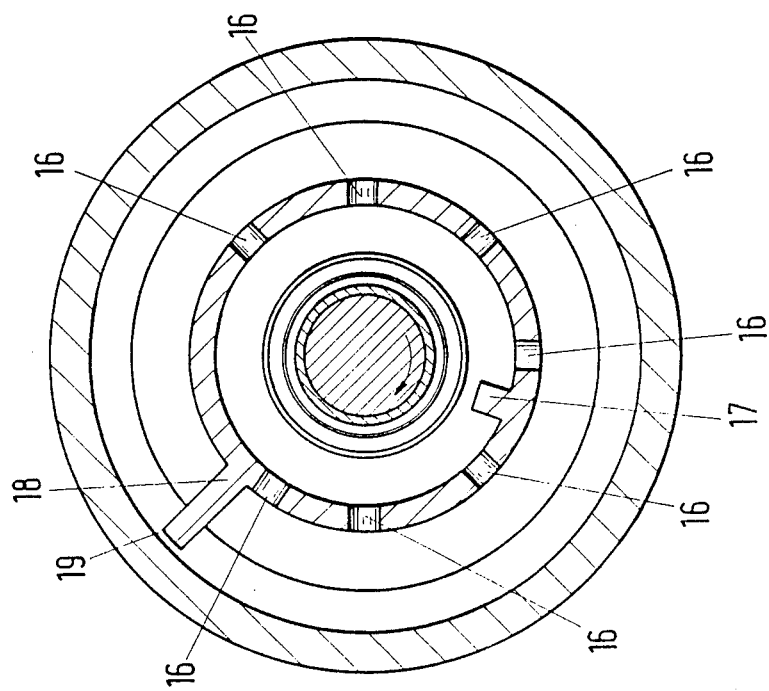
FIG. 3 shows a cross-section according to line A—A of FIG. 2
Figure 2:
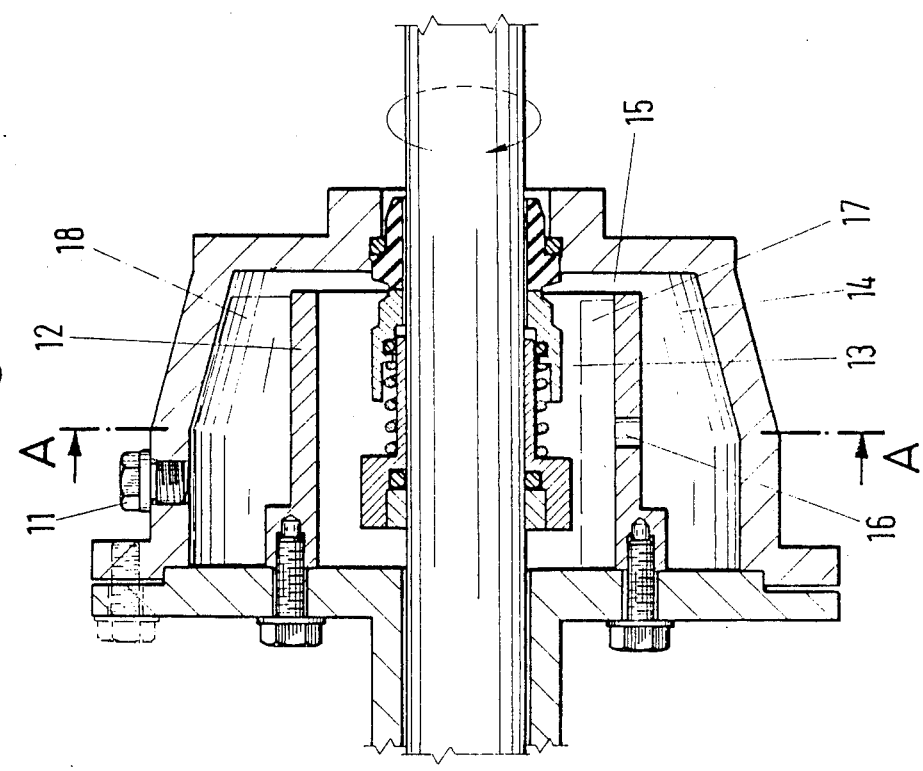
FIG. 2 shows a longitudinal section through a first embodiment of the seal arrangement

In the embodiment of the seal arrangement according to FIGS. 2 and 3, the sealing space 9 is subdivided by a preferably cylindrical wall 12 into an inner region 13 and an outer region 14. These are interconnected firstly by the annular gap 15 in the vicinity of the sealing surfaces of the mechanical seal and secondly, in a region axially remote therefrom, by bores 16. From the wall 12 there protrudes inwards in the inner region at a geodetically low-lying point, a rib 17, which extends substantially radially up to the outer periphery of the mechanical seal 5 all but for a few millimeters. Substantially radially should be understood to mean transverse to the shaft circumferential direction, and includes a rib arranged running obliquely to the longitudinal direction (not axially parallel), in order to improve the flow velocity and the stripping effect. In the outer region 14, there extends from the wall 12 a rib 18, which lies approximately 45° in the direction of rotation ahead of the upper apex and projects up to the sealing space wall all but for a narrow gap 19, so that here a restrained through-flow, in particular of the gas accumulated ahead of the rib, can take place.

A circulation flow establishes itself, which leads through the bores 16 out of the inner region into the outer region and back through the gap 15 onto the sliding surface area of the mechanical seal. In FIG. 3, it is clear that the rotating parts of the mechanical seal will tend to produce a rotation of the fluid immediately surrounding the shaft, in the same direction, i.e., clockwise in the direction of the arrow superimposed on the shaft in FIG. 3. The rotating liquid impinges upon the rib 17, which produces a dynamic pressure in the fluid that has, in effect, been restricted by the rib 17. This relatively higher pressure in the circulating liquid causes the liquid to leave the space within cylindrical wall 12, through bores 16, which are more remote from the sliding surface than is annular gap 15. Gap 15, having less restriction, is also at a lower pressure than the fluid immediately behind rib 17, so that an axial flow loop is established, at least in those parts of the gap which are not immediately adjacent rib 17.

While the circulating flow is in the outer region, the flow velocity is less than the flow velocity that flushes the sealing surface, and, according to the invention, the velocity is reduced or quieted to the extent that entrained or boiled gas in the liquid separates therefrom.

The inner rib 17 causes a strong turbulence at the periphery of the mechanical seal, so that gas bubbles which may have previously been released in the liquid flowing there are torn off and carried with the circulation flow into the outer region 14, which has a greater flow cross-section and is greatly stabilized, in particular in its region lying to the left of the line of intersection A—A in FIG. 2, so that gases separated can drift upwards and accumulate in the protection of the rib 19 in the apex region. This region is stabilized by the rib 18 and by the absence of a bore 16. The gas accumulating there is therefore permanently extracted from the circulation stream. The size of this space available for receiving the gas is dimensioned such that it is sufficient for prolonged operation. Thus, it should be appreciated that the flushing flow entering the sliding surface through gap 15 does not contain significant quantities of gas. This is achieved by the stripping of gas in the liquid in the inner space 13 away from the sliding surface, and the circulation of the liquid with the stripped gas into the outer space 14 where the liquid movement is quieted by the rib 18. In this outer space, the gas bubbles are allowed to unite and to collect in the apex of the outer space, thereby separated from the flushing flow.

Figure 5:
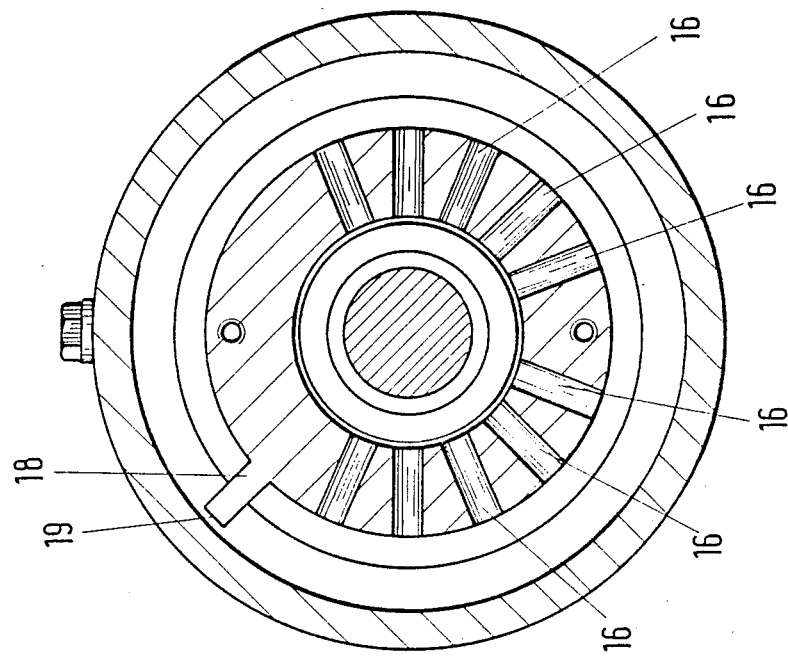
FIG. 5 shows a cross-section according to the line B—B of FIG. 4
Figure 4:
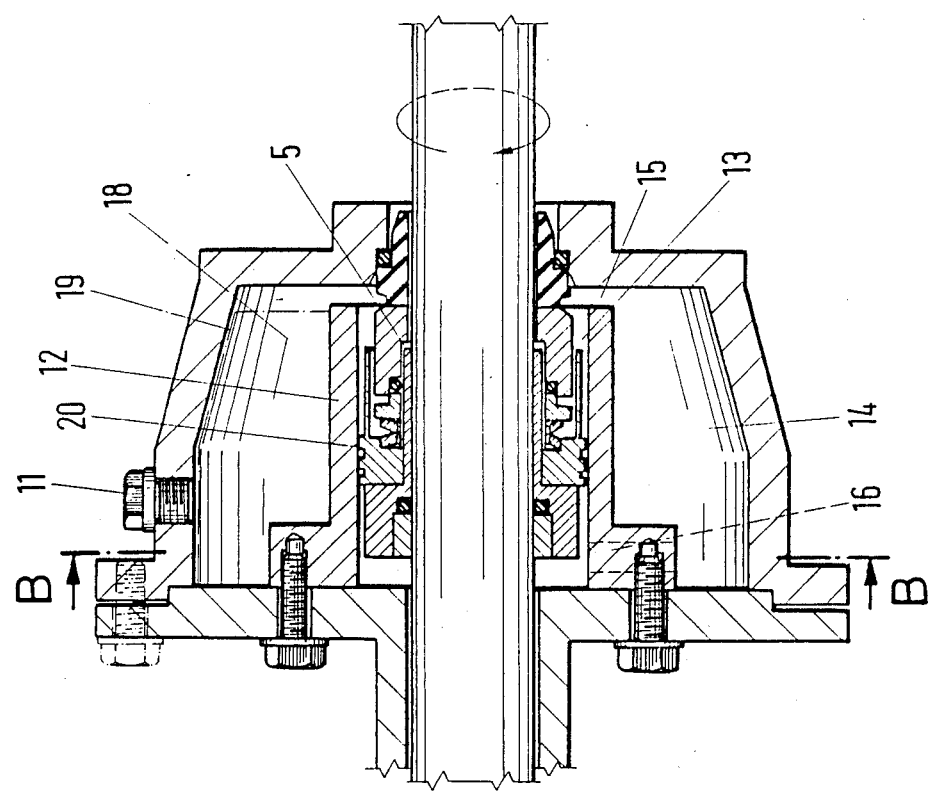
FIG. 4 shows a longitudinal section through a second embodiment of the seal arrangement.

Unless otherwise described below, the design according to FIG. 5 is the same as that according to FIGS. 2 and 3. The wall 12 separating the inner region 13 from the outer region 14 is only a few millimeters away from the outer periphery of the mechanical seal 5. Between the rotating part of the mechanical seal and the wall 12 there is provided a delivery thread 20. The bores 16 for the connection of the two regions are located in the flange part of the wall 12. The delivery thread 20 delivers the liquid in the inner region to the bores 16, so that, after passing the outer region 14, it is diverted through the annular gap 15 onto the sliding surface area of the mechanical seal. The narrowness of the inner region 13 in conjunction with the forced through-flow ensures the remoteness of gas separations from the mechanical seal.

Figure 7:
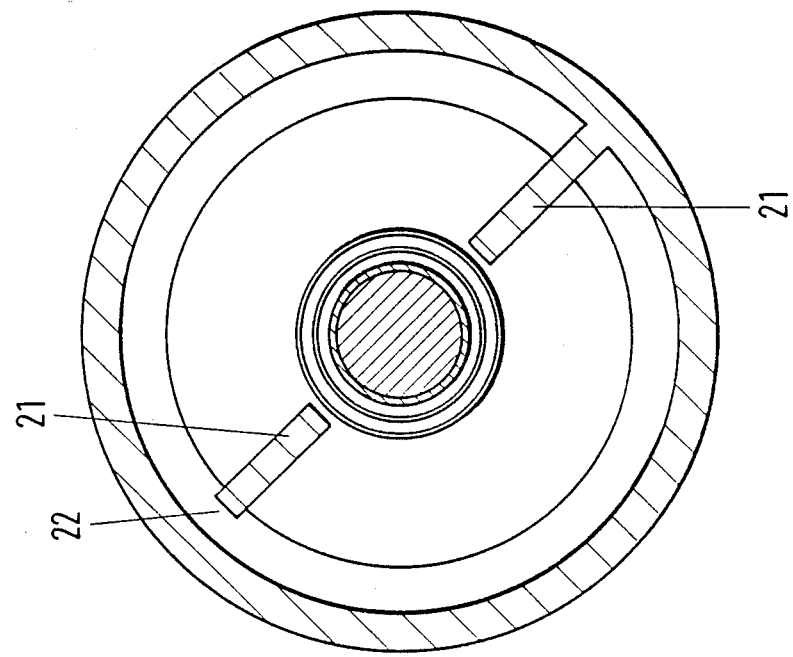
FIG. 6 shows a longitudinal section through a third embodiment of a seal housing and FIG. 7 shows a cross-section along line C—C of FIG. 6.
Figure 6:
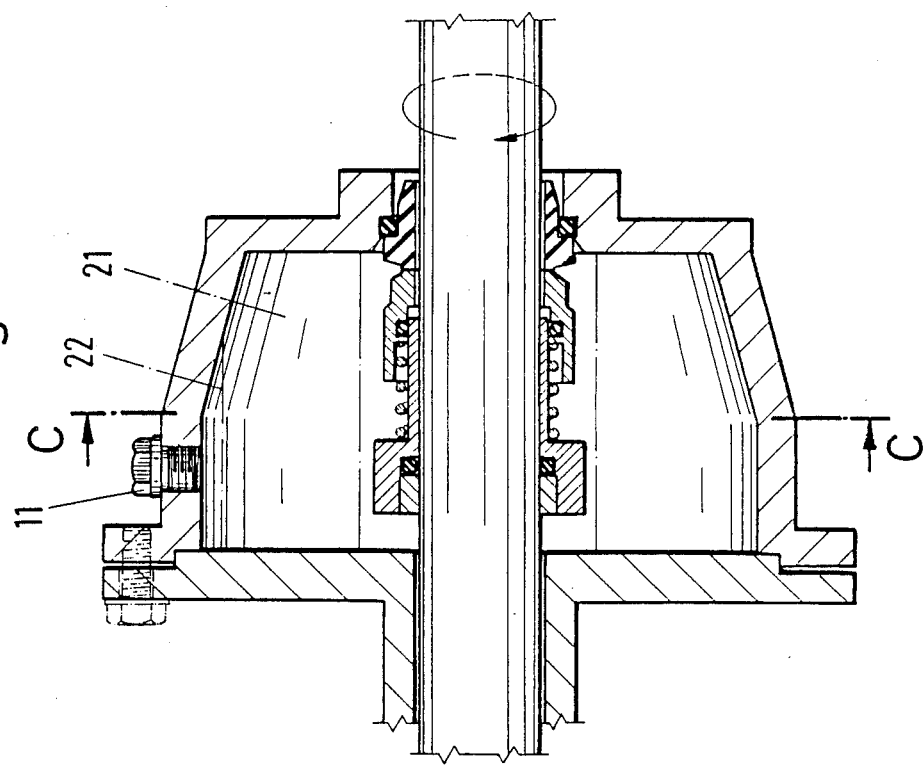

In the design according to FIGS. 6 and 7, there are arranged in the mechanical seal space 9 two radial ribs 21, which reach up to the outer periphery of the mechanical seal 5 all but for a few millimeters. They contain break-throughs 22, which may be designed as bores within the rib surface and/or as a gap with respect to the outer sealing space limitation and make possible a flowing-through of liquid and gas but stabilize the flow (at least in the apex region) such that the separated gas accumulate there. The ribs effect powerful turbulence at the seal periphery, in order to tear away the gas separations located there. At the same time, they effect a flow stabilization in the region radially remote from the seal, so that the gas can be separated and rise to the apex region, in order to be removed from there through the venting openings 11 at an appropriate time.

We claim:

1. A centrifugal pump for the delivery of hot liquids, the pump having a housing (1,2), at least one shaft passage through the housing to the exterior thereof, and a shaft disposed in said passage, said passage having a mechanical sliding seal (5) exterior to the housing and arranged inside wall means defining a confined sealing space (9) which contains some of the liquid and is separated from the housing by a spacer zone (8) in the passage through which the shaft passes with close shaft play, characterized in that the sealing space includes:

flow means (12, 20, 21) for the generation of a liquid circulation within the sealing space (9) for the flushing of the sliding surface area of the mechanical seal as the shaft rotates;

stabilization means for inducing a stabilized low velocity flow of the liquid circulation away from the mechanical seal (5), such that gas entrained in said stabilized flow separates from the liquid;

means defining a large-volume, flow-stabilized, ventable pocket remote from the seal and in fluid communication with the stabilized flow of liquid circulation, for receiving and accumulating the separated gas in said stabilized flow; and means (11) for removing the accumulated gas from the ventable pocket.

2. Centrifugal pump according to claim 1, characterized in that the sealing space (9) is divided by an inner wall into an inner region (13) and an outer region (14), which have a first fluid connection (15) close to the sliding surface of the mechanical seal (5) and a second fluid connection (16) remote therefrom.

3. Centrifugal pump according to claim 1, characterized in that said flow means includes at least one rib (17, 21), which extends substantially radially toward the shaft and is closely spaced from the periphery of the mechanical seal (5).

4. Centrifugal pump according to claim 3, characterized in that the rib (17, 21) is arranged at an elevation within the pump that is below the elevation of the shaft.

5. Centrifugal pump according to claim 3, characterized in that the rib (17, 21) runs obliquely to the axial direction of the shaft.

6. Centrifugal pump according to claim 3 characterized in that said at least one rib includes a plurality of ribs (21) extending between the wall means and the mechanical seal (5).

7. Centrifugal pump according to claim 6, characterized in that the ribs (21) contain breakthroughs (22) for the passage of liquid and separated gas toward the pocket means.

8. Centrifugal pump according to claim 2, characterized in that the inner region (13) and the outer region (14) are separated by a substantially tubular inner wall (12).

9. Centrifugal pump according to claim 8, characterized in that the mechanical seal includes a rotating part and there is arranged between the tubular wall (12) and the rotating part, a thread (20) for generating the circulating liquid flow along said seal sliding surface to one of said first or second fluid connections.

10. Centrifugal pump according to claim 1, characterized in that said sealing space contains above the elevation of the shaft at least one rib (18, 21), which runs transversely to the shaft circumferential direction and leaves a small flow cross-section (19, 22) free to permit flow from one side of the rib to the other.

11. Centrifugal pump according to claim 10, characterized in that the rib (18, 21) is arranged, at an angular position along the direction of shaft rotation, ahead of the geodidic apex of the wall means.

12. Centrifugal pump according to claim 10 characterized in that the small flow cross-section is a gap (19, 22) disposed between the wall means and the radially outside edge of the rib.

13. Centrifugal pump according to claim 1, characterized in that the pump includes a region of high pressure and wherein the sealing space (9) is connected to the region of high pressure in the pump.

14. Centrifugal pump according to claim 13, characterized in that the high pressure in the sealing space is provided through a fluid connection from the region of high pump pressure to the pump side of the spacer zone (8).

15. Centrifugal pump according to claim 1, characterized in that the means for removing gas includes a venting pot with a selectively operable venting device.

16. Centrifugal pump according to claim 1, characterized in that the pocket contains a sensor for the monitoring of operating conditions.

17. A centrifugal pump for recieving hot liquid at low pressure and delivering the hot liquid at a relatively higher pressure, comprising:

a housing containing a low pressure region and a relatively high pressure region;

a shaft penetrating and extending outside of the housing;

bearing means for supporting the shaft outside the housing;

means extending outside the housing and defining a passage in which the shaft is disposed with clearance;

means for fluidly connecting the passage to at least one of said pressure regions;

a sealing chamber outside the housing fluidly connected to the passage and defining a sealing space through which the shaft passes;

mechanical sealing means located within the sealing chamber and including a sliding seal surface;

first means, located within the sealing chamber, for circulating at least ome of the liquid within the chamber along a flow path at a high velocity adjacent the sealing means, to flush the sliding surface;

second means, located within the sealing chamber, for reducing the velocity of the circulating flow away from the mechanical sealing means, whereby gas entrained in the circulating liquid separates therefrom; and third means associated with said second means, for accumulating the separated gases in the sealing chamber.

18. Centrifugal pump according to claim 17, characterized in that the sealing chamber is divided by said first means, into an inner region (13) and an outer region (14), which have a first fluid connection (15) close to the sliding surface of the mechanical seal (5) and a second fluid connection (16) remote therefrom.

19. Centrifugal pump according to claim 17, characterized in that said first means includes at least one rib (17, 21), which extends generally transversely to the shaft and is closely spaced from the periphery of the mechanical seal (5).

20. Centrifugal pump according to claim 1, characterized in that the pump includes regions of relatively high and low pressures, and the sealing space is connected to the region of low pressure through a restrictor.

21. Centrifugal pump according to claim 15, characterized in that the venting pot contains a sensor for the monitoring of operating conditions.

22. A centrifugal pump for delivering a hot liquid which can entrain gas, comprising:
 a pump housing;
 first wall means outside the housing, defining a sealing chamber;
 a passage fluidly connecting the housing and the sealing chamber;
 a pump shaft extending through the passage from the housing into the chamber;
 a mechanical seal associated with the shaft within the sealing chamber and including a sliding seal surface for preventing the leakage of liquid out of the chamber while the shaft rotates;
 first means within the chamber, for circulating the liquid within the chamber along a flow path adjacent the seal to flush the sliding surface with a relatively high velocity liquid flow;
 second means within the chamber, for establishing a stabilized low velocity flow of the circulating liquid away from the seal, whereby entrained gas can separate;
 third means within the chamber, defining an accumulation zone for accumulating the separated gas; and fourth means, associated with the third means, for removing the accumulated gases from the chamber.

23. The pump according to claim 22, wherein,
 the first means includes second wall means within the first wall means, surrounding at least the mechanical seal and defining outer and inner regions of the chamber, and
 the accumulation zone is situated in the outer region.

24. The pump according to claim 23, wherein the second wall means includes a flow connection between the regions adjacent to the sliding surface and another flow connection between the regions remote from the sliding surface.

25. The pump according to claim 24, wherein the first means includes a rib projecting from the second wall toward the shaft, for increasing the velocity of the circulating flow near the sliding seal surface.

26. The pump according to claim 23, wherein the second means includes an outer rib in the geodidic upper portion of the outer region.

27. The pump according to claim 24, wherein the second means includes an outer rib in the geodidic upper portion of the outer region.

28. The pump according to claim 25, wherein the second means includes an outer rib in the geodidic upper portion of the outer region.

29. The pump according to claim 26, wherein the outer rib projects from the second wall means and is closely spaced from the first wall means.

30. The pump according to claim 22, wherein the cross sectional area of the chamber is greater than the cross sectional area of the passage, and at least the second and third means are formed in part by at least one rib extending substantially radially in the vicinity of the first wall means.

31. The pump according to claim 30, wherein the second means include a space between the radially outer portion of the ribs and the wall means.

32. The pump according to claim 30, wherein the rib extends between the mechanical seal and the first wall means, the radially inner portion of the rib being closely spaced from the mechanical seal.

33. The pump according to claim 32, wherein the second means include openings in the ribs.

34. The pump according to claim 32, wherein the third means is formed at least in part by the geodidic apex of the first wall means.

* * * * *